United States Patent [19]

Viegas et al.

[11] Patent Number: 5,259,198

[45] Date of Patent: Nov. 9, 1993

[54] AIR CONDITIONING AND REFRIGERATION SYSTEMS UTILIZING A CRYOGEN

[75] Inventors: Herman H. Viegas, Bloomington, Minn.; Roland L. Roehrich, Pittsburgh, Pa.

[73] Assignee: Thermo King Corporation, Minneapolis, Minn.

[21] Appl. No.: 982,368

[22] Filed: Nov. 27, 1992

[51] Int. Cl.$^5$ ............................................. F25B 19/00
[52] U.S. Cl. ........................................... 62/7; 62/239; 62/434
[58] Field of Search ................... 62/7, 239, 434, 323.2

[56] References Cited

U.S. PATENT DOCUMENTS

| | | | |
|---|---|---|---|
| 2,535,364 | 12/1950 | Lee | 62/7 |
| 3,740,961 | 6/1973 | Fischer | 62/7 |
| 3,802,212 | 4/1974 | Martin et al. | 62/52 |
| 3,823,568 | 7/1974 | Bijasiewicz et al. | 62/7 |
| 4,045,972 | 9/1977 | Tyree, Jr. | 62/156 |
| 4,100,759 | 7/1978 | Tyree, Jr. | 62/55 |
| 4,186,562 | 2/1980 | Tyree, Jr. | 62/62 |
| 4,406,129 | 9/1983 | Mills | 62/7 |
| 4,441,326 | 4/1984 | Bernauer et al. | 62/7 |
| 4,498,306 | 2/1985 | Tyree, Jr. | 62/119 |
| 4,608,830 | 9/1986 | Peschka | 62/7 |
| 5,040,374 | 8/1991 | Micheau | 62/52.1 |
| 5,069,039 | 12/1991 | Martin | 62/50.3 |
| 5,072,703 | 12/1991 | Sutton | 123/179.4 |
| 5,090,209 | 2/1992 | Martin | 62/50.3 |
| 5,127,230 | 7/1992 | Neeser et al. | 62/7 |
| 5,147,005 | 9/1992 | Haeggstrom | 62/7 X |

*Primary Examiner*—William E. Tapolcai
*Attorney, Agent, or Firm*—M. J. Moran

[57] ABSTRACT

A refrigeration system associated with a conditioned space to be controlled to a predetermined set point temperature via heating and cooling cycles. The refrigeration system includes a heat exchanger, air mover apparatus disposed to circulate air between the conditioned space and the heat exchanger, cryogenic cooling apparatus which includes a combustible fuel in a cryogenic state, and heating apparatus. The cryogenic characteristic of the fuel is utilized to implement the cooling cycle, and the combustible characteristic of the fuel is utilized by the heating apparatus to implement the heating cycle. In preferred embodiments of the invention an internal combustion engine is associated with the refrigeration system, and the air mover means includes a vapor motor, with the cryogenic fuel being vaporized and then expanded in the vapor motor to drive same, and with the expanded vaporized fuel operating the internal combustion engine.

22 Claims, 3 Drawing Sheets

AIR CONDITIONING AND REFRIGERATION SYSTEMS UTILIZING A CRYOGEN

TECHNICAL FIELD

The invention relates in general to air conditioning and refrigeration systems, and more specifically to the use of a cryogen for controlling the temperature of a conditioned space associated with stationary and transport type applications of air conditioning and refrigeration systems.

BACKGROUND ART

Stationary and transport applications of air conditioning and refrigeration systems control the temperature of a conditioned space to a predetermined temperature range adjacent to a selected set point temperature, with transport applications including those associated with a vehicle, such as a straight truck, a tractor-trailer combination, a refrigerated container, and the like. Such systems conventionally utilize a chlorofluorocarbon (CFC) refrigerant in a mechanical refrigeration cycle. The mechanical refrigeration cycle requires a refrigerant compressor driven by a prime mover, which often includes a dedicated internal combustion engine, such as a diesel engine. Because of the suspected depleting effect of CFC's on stratospheric ozone ($O_3$), practical alternatives to the use of CFC's are being sought.

The use of a cryogen, i.e., a gas which has been compressed to a very cold liquid state, such as carbon dioxide ($CO_2$) and nitrogen ($N_2$), in air conditioning and refrigeration systems is particularly attractive because, in addition to eliminating the need for a CFC, it also eliminates the need for a compressor and associated prime mover. Air conditioning and refrigeration systems of which we are aware which utilize a cryogen, implement a cooling cycle by circulating the cryogen through a fluid path which includes a heat exchanger which is in heat exchange relation with air from a conditioned space. When a heating cycle is required to hold the temperature of the conditioned space within a predetermined narrow temperature band adjacent to a selected set point temperature, or a defrost cycle is required, the cryogen is heated by a burner and associated fuel, and the heated cryogen is circulated through the fluid path and heat exchanger. Thus, cryogen is expended to the atmosphere during a cooling cycle, and cryogen plus a fuel, such as propane, diesel fuel, liquid natural gas, and the like, are expended to the atmosphere to implement heating and defrost cycles.

It would be desirable, and it is an object of the present invention, to provide new and improved cryogenic based air conditioning and refrigeration systems, which more effectively and efficiently utilize the cryogen, for lower cost operation, as well as for an extended operating time for a given vessel of cryogen.

SUMMARY OF THE INVENTION

Briefly, the present invention is an air conditioning and refrigeration system for controlling the temperature of a conditioned space using a cryogen, via heating, cooling and null cycles, as required to achieve and hold the temperature within a predetermined narrow temperature range adjacent to a selected set point temperature. The refrigeration system includes cryogenic cooling means, with the cryogenic cooling means including a combustible fuel in a liquid, cryogenic state. First heat exchanger means is disposed in heat transfer relationship with the conditioned space, second heat exchanger means is disposed in heat transfer relationship with the cryogenic cooling means, and means is provided for interconnecting the first and second heat exchanger means to utilize the cryogenic aspect of the fuel to implement the cooling cycle. Heating means is also provided, along with third heat exchanger means which is disposed in heat transfer relationship with the heating means. Means interconnects the first and third heat exchanger means to implement the heating cycle. The heating means includes means for utilizing the combustible aspect of the fuel to provide heat during a heating cycle.

In embodiments of the invention associated with an internal combustion engine, means is provided for vaporizing the liquid, cryogenic fuel, and additional means connects the vaporized fuel to the internal combustion engine for operation thereof from the cryogenic fuel supply.

In another embodiment of the invention which includes an internal combustion engine, air mover means is provided for circulating air between the conditioned space and the first heat exchanger means, with the air mover means including a vapor motor. Means is provided for vaporizing the cryogenic fuel, with the vapor motor being operated by expanding the vaporized fuel therein, and with the internal combustion engine being operated via the expanded vaporized fuel.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature range adjacent to the selected set point temperature. In the Figures, valves which are normally open (n.o.), are illustrated with an empty circle, and valves which are normally closed (n.c.) are illustrated with an "X" within a circle. Of course, the associated electrical or electronic control, hereinafter called "electrical control", may be changed to reverse the deenergized states shown. An arrow pointed at a valve in the Figures indicates that the valve is, or may be, controlled by the electrical control.

The invention is suitable for use when refrigeration system 10 is associated with a single conditioned space to be controlled to a selected set point temperature; and, the invention is also suitable for use when refrigeration system 10 is associated with a compartmentalized conditioned space, i.e., at least first and second separate conditioned spaces are provided which are to be individually controlled to selected set point temperatures. In a compartmentalized application, for example, one conditioned space may be used to condition a frozen load, and the other a fresh load, or combinations thereof, as desired.

Figure 1:
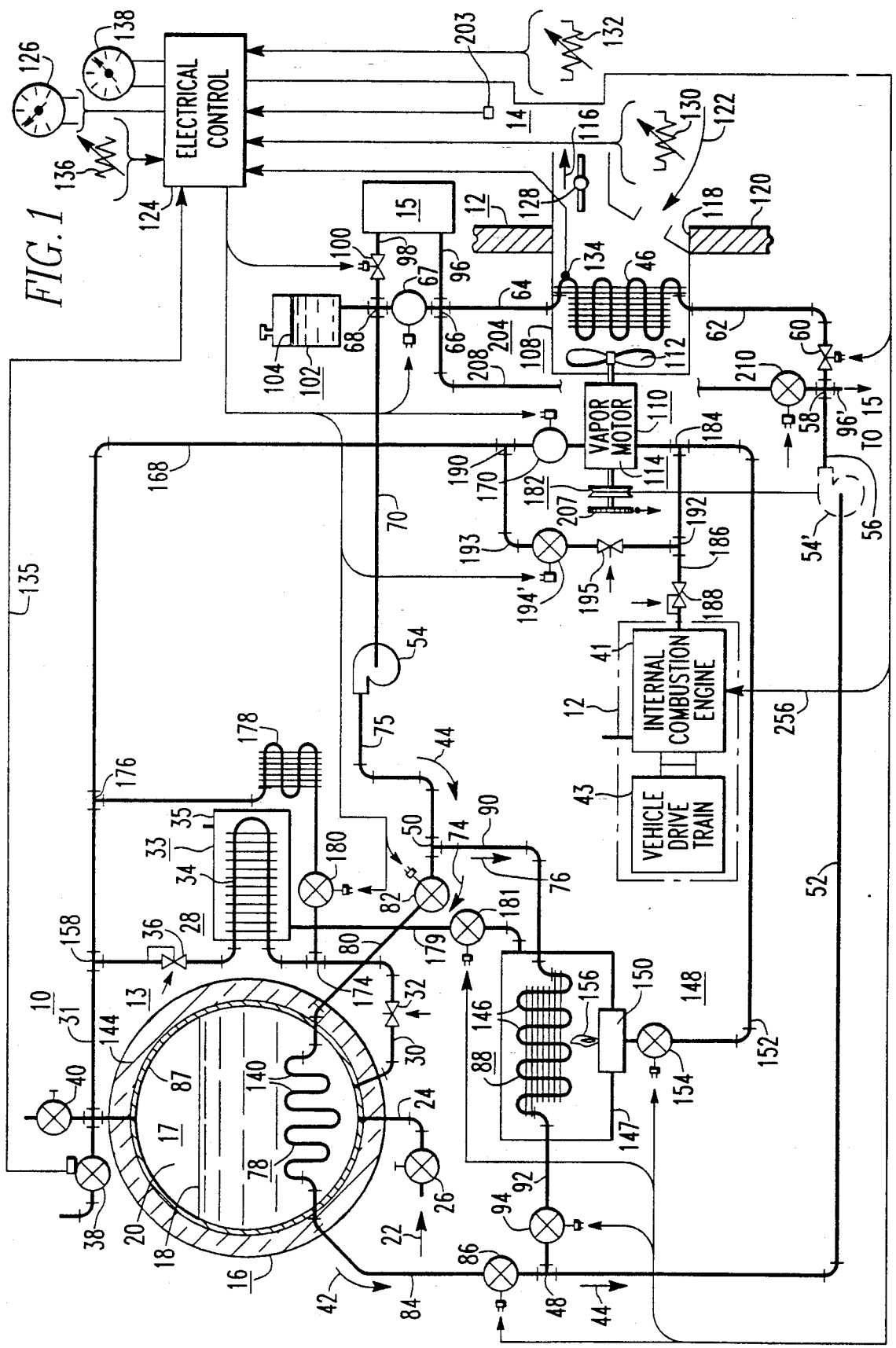
FIG. 1 is diagrammatic representation of a refrigeration system and internal combustion engine fuel supply arrangement constructed according to a first embodiment of the invention, including cryogen cooling means which includes a combustible fuel in a liquid, cryogenic state which is used to implement cooling and heating cycles, as well as for operating the vehicle engine.

Referring now to the drawings, and to FIG. 1 in particular, there is shown a refrigeration system 10 suitable for use with any conditioned space, and particularly well suited for use on straight trucks, tractor-trailer combinations, containers, and the like, with the word "vehicle" being used to generically refer to the various transport vehicles which utilize refrigeration systems.

Refrigeration system 10 may be used in stationary and transport applications, with reference number 12 indicating a vehicle in a transport application, and simply an insulated wall in a stationary application. Refrigeration system 10 may be associated with a single conditioned space 14 to be controlled to a pre-selected set point temperature, and refrigeration system 10 may be associated with a compartmentalized application including two or more separate conditioned spaces 14 and 15 to be individually conditioned to selected set point temperatures. Conditioned space 15 will also be referred to as conditioned space and air conditioning apparatus 15, as reference 15 is used to generally refer both to a conditioned space and associated air conditioning apparatus, including a heat exchanger, for conditioning the space.

Refrigeration system 10 includes cryogenic cooling means 13. Cryogenic cooling means 13 includes a vessel 16 containing a combustible fuel 17 in a cryogenic state, with liquid and vapor phases thereof being respectively indicated at 18 and 20. In a preferred embodiment of the invention fuel 17 is liquid natural gas (LNG), which is predominately methane ($CH_4$). However, any fuel available in a cryogenic state may be used, including propane ($C_3H_8$) and ethane ($C_2H_6$). Vessel 16 may be filled, for example, by connecting a ground support apparatus, indicated generally at 22, to a supply line or conduit 24 which includes a valve 26.

Vapor pressure in vessel 16 is maintained above a predetermined value by a pressure building and regulating arrangement 28 in which conduits 30 and 31 respectively connect pressure building means 33 to lower and upper points of vessel 16. Conduit 30, which connects a low point of vessel 16 to pressure building means 33, includes a valve 32. The pressure building means 33 includes a vaporizing coil 34, which may be directly exposed to ambient temperatures, or which may be disposed within a housing 35 for purposes which will be hereinafter explained. Conduit 31, which connects pressure building means 33 to a high point of vessel 16, includes a pressure regulating valve 36. Valve 36 maintains the vapor pressure in vessel 16 at a predetermined level, which may be determined and selected each time vessel 16 is filled, if necessary. A pressure reading safety valve 38 is provided in conduit 31 at a point where the vapor pressure in vessel 16 may be directly sensed. A venting valve 40 is also provided to facilitate the filling process. Valve 40 may be connected to ground support apparatus 22 during filling, if desired.

Valve 32 opens when the pressure in vessel 16 falls to a predetermined value, to enable the cryogen to flow into the pressure building arrangement 28. The predetermined value selected is based on factors such as optimum delivery system pressure and performance.

As hereinbefore stated, valve 32 admits liquid cryogen into vaporizing coil 34, and vaporizing coil 34 is exposed to the ambient temperature outside of vehicle 12. As disclosed in concurrently filed application Ser. No. 07/982,333, heat produced during the normal operation of a refrigeration system may be used to enhance the vapor producing capabilities of ambient loops, such as vaporizing coil 34. Thus, vaporizing coil 34 may be exposed to higher temperatures than ambient, especially during low ambient temperature conditions, by utilizing gases produced as a product of combustion of vaporized fuel 20 during heating and defrost cycles; or, by utilizing a warmed liquid coolant associated with an internal combustion engine 41.

In the embodiment of the invention set forth in FIG. 1, internal combustion engine 41 is associated with vehicle 12, such as by being connected to a vehicle drive train 43 which propels vehicle 16, and thus refrigeration system 10 is illustrated in a transport application. When refrigeration system 10 is associated with a refrigerated container, engine 41, instead of being a vehicle drive engine, may be the prime mover for an electrical generator in a "gen-set" package utilized until the container is transported to a location which has a source of electrical potential.

Using LNG as an example of a suitable fuel 17 in cryogenic form, vessel 16 may be filled with LNG at an initial pressure of about 300 psia and an initial temperature of about $-160°$ F. ($-107°$ C.), which will thermodynamically satisfy the low temperature end of the usual temperature control range of most refrigeration systems, including transport applications. Of course, other pressures and temperatures may be used than set forth in this example, as long as the temperature of the cryogen is low enough to thermodynamically maintain the desired set point temperature, or temperatures, in the associated conditioned space, or spaces.

The present invention includes a fluid flow path 42, which will be called a "closed" fluid flow path as it is completely isolated from any direct contact with the cryogenic fuel 17, and from any direct contact with the air in conditioned space 14. Closed fluid flow path 42 may be at atmospheric pressure, or pressurized, as desired. The closed fluid flow path 42 includes a first portion 44 having a first heat exchanger 46. The first portion 44 extends between tees 48 and 50, with the first portion 44 including, from tee 48 to tee 50, a conduit 52, an optional position for a pump, referenced 54', as a preferred location is referenced 54, a conduit 56, a connector 58, a flow control valve 60, a conduit 62, the first heat exchanger 46, a conduit 64, a connector 66, a valve 67, a connector 68, a conduit 70, the preferred location for pump 54, and a conduit 75.

Figure 2:
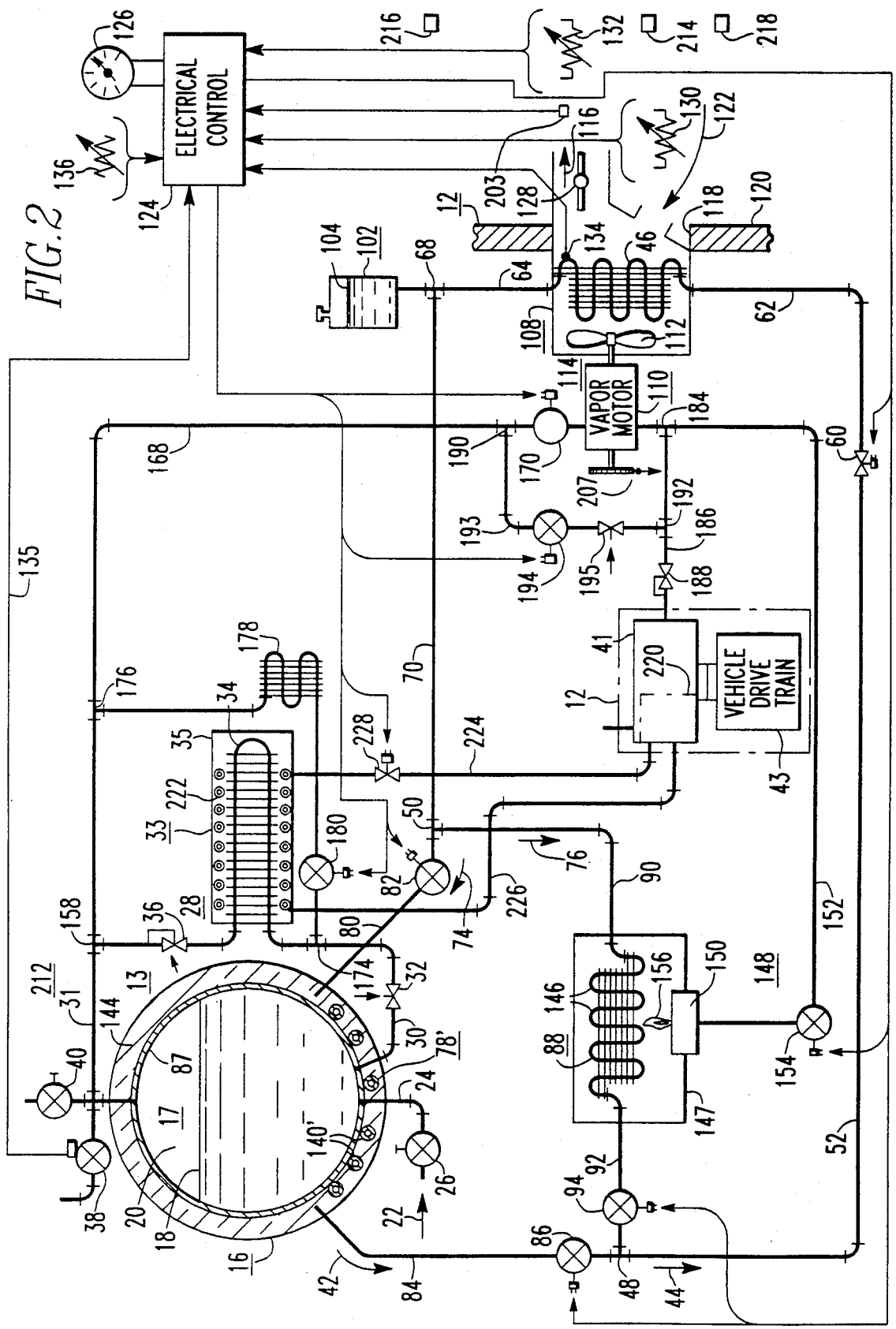
FIG. 2 is a diagrammatic representation of a refrigeration system which is similar to that of FIG. 1 except illustrating additional aspects and embodiments of the invention.
Figure 3:
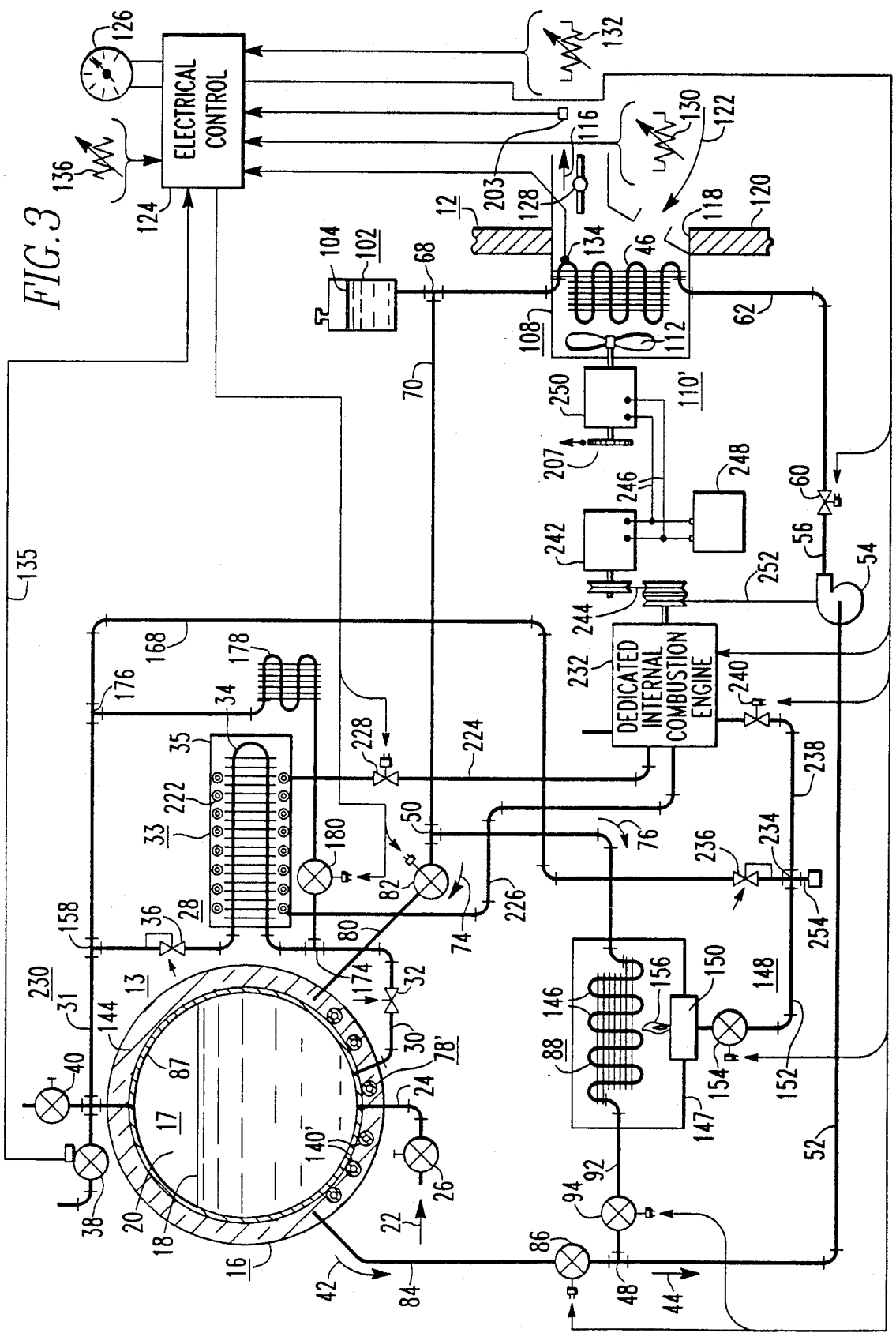
FIG. 3 is a diagrammatic representation of a refrigeration system constructed according to still other embodiments of the invention in which an internal combustion engine operated by fuel derived from a cryogenic state thereof is dedicated to the refrigeration system.

The closed fluid flow path 42 includes second and third portions 74 and 76 which are connected in parallel with the first portion 44, each extending between tees 48 and 50. The second portion 74 includes a second heat exchanger 78. The second heat exchanger 78 is connected between tees 50 and 48 via a conduit 80 which includes a valve 82, and a conduit 84 which includes a valve 86. The second heat exchanger 78 is illustrated as being disposed within vessel 16, in direct heat exchange relation with cryogen 18, but as illustrated in FIGS. 2 and 3, the second heat exchanger 78 may be disposed in heat exchange relation with a wall 87 of vessel 16. The third portion 76 includes a third heat exchanger 88. The third heat exchanger 88 is connected between tees 50 and 48 via a conduit 90, and a conduit 92 which includes a valve 94.

The second conditioned space and air conditioning apparatus 15, in a compartmentalized application, in a first embodiment thereof, is connected between connectors 66 and 68 via conduits 96 and 98, with one of the conduits, such as conduit 98, including a flow control valve 100. Valve 67 is closed when apparatus 15 is operational.

In a second embodiment, apparatus 15 is connected in parallel with the first heat exchanger 46, instead of in series. In this alternate embodiment, the connection to conduit 96 is made from connector 58 in conduit 56, instead of from connector 66 in conduit 64. Valve 67 may be replaced by a check valve in the second embodiment.

An expansion and fill tank 102, for filling the closed fluid flow path 42 with a heat-exchange or secondary fluid 104, and also for allowing temperature induced expansion and contraction of the secondary fluid 104, is connected to connector 68. Tank 102 and the closed fluid flow path may be pressurized, depending upon the specific secondary fluid selected. The secondary fluid 104 should be a wide range liquid coolant selected to have good heat transfer and good transport properties while remaining in a liquid state throughout the different temperatures it will be subjected to. Examples of a suitable fluid for the secondary fluid include ethylene glycol and D-Limonene, with the latter being a trade name of Florida Chemical Co., Inc., Lake Alfred, Fla.

The first heat exchanger 46 is associated with an air conditioning means or apparatus 108 which includes air mover means 110. Air mover means 110 includes a fan or blower 112 driven by a suitable motor 114. In a preferred embodiment of the invention, motor 114 is a vapor driven motor which is driven by vaporized cryogen 20 obtained from supply vessel 16 by arrangements which will be hereinafter explained. Air conditioning means 108 directs conditioned or discharge air, indicated by arrow 116, into conditioned space 14, via an opening 118 in a wall 120 of vehicle 12.

Return air from conditioned space 14, indicated by arrow 122, is drawn through opening 118 by air mover means 110, and into heat exchange relation with the first heat exchanger 46. The resulting conditioned air 116 is discharged back into conditioned space 14 via opening 118 and a discharge plenum which separates return air from discharge air.

Electrical control 124 is provided for controlling the temperature of conditioned space 14 to a predetermined set point temperature which is selected by a set point selector 126. Electrical control 124 controls the temperature of conditioned space 14 via cooling and heating cycles, and electrical control 124 also initiates a defrost cycle to remove water ice build-up on heat exchanger 46, and a heat exchanger associated with apparatus 15, via a heating cycle. If it is desired that air mover means 110 remain operational during a defrost cycle, a controllable damper 128 is provided which closes opening 118 during defrost.

Electrical control 124 receives inputs from a return air temperature sensor 130, a discharge air temperature sensor 132, a coil temperature sensor 134, an ambient air temperature sensor 136, and a pressure sensor associated with vessel 16, such as via the control line 135 from pressure reading valve 38. When more than one conditioned space is conditioned, such as the additional conditioned space and air conditioning apparatus indicated generally at 15, a set point temperature selector is also provided for each additional conditioned space, such as a set point temperature selector 138 for conditioned space 15. The additional conditioned space and associated air conditioning apparatus 15 may be constructed in the same manner as conditioned space 14 and the associated air conditioning means 108, and is thus not shown in detail. Fans or blowers in the additional conditioned spaces may be driven by electric, hydraulic, pneumatic, or vapor motors, as desired.

The return air temperature, discharge air temperature, and ambient air temperature determine when electrical control 124 commands cooling and heating cycles, and the temperature of the coil surface of the first heat exchanger 46 detected by sensor 134 may be utilized to determine when a defrost cycle should be initiated. A defrost cycle may also be initiated by other means, such as by a timer, by a manually actuated switch, by a programmed algorithm, and the like.

The second heat exchanger 78 is associated with cryogen cooling means 13, removing heat from the secondary fluid 104, and transferring the heat into the liquid cryogen 18. The second heat exchanger 78 may be constructed as illustrated in FIG. 1, having a plurality of coil turns or loops 140 disposed within, and near the bottom of a metallic tank wall 87 of vessel 16. Thus, the turns or loops 140 of the heat exchanger are inside vessel 16, submerged in the liquid cryogen 18. Thermal insulation 144 surrounds inner tank 142, or a vacuum tank may be used. A suitable alternate construction arrangement for the second heat exchanger 78 is shown in FIGS. 2 and 3, with this alternate arrangement having a plurality of turns or loops 140' disposed in thermal contact with the outside surface of tank wall 87 of vessel 16, surrounded by thermal insulation 144.

The third heat exchanger 88 includes a plurality of coil turns or loops 146 disposed within a suitable housing 147. Coil turns 146 are heated by heating means 148. Heating means 14 includes a burner 150. Vaporized fuel 20 from vessel 16, as will be hereinafter explained, is selectively directed to burner 150 via a conduit 152 and a valve 154. When electrical control 124 opens valve 154 to initiate the heating of coil turns 146 and the secondary fluid 104 therein, burner 150 is simultaneously ignited to provide a flame indicated at 156. In stationary applications, other suitable heat sources for heating the cryogen may be used, including electrical, hot liquids, and hot waste gases.

Vaporized cryogen 20 for burner 150, as well as for operating vapor motor 114 and internal combustion engine 41 in the embodiment of FIG. 1, independent of whether electrical control 124 is commanding cooling or heating cycles in the conditioned spaces 14 and 15, may be provided by tapping conduit 31. For example, conduit 31 may be tapped via a tee 158, drawing vaporized cryogen 20 from vessel 16 and from the pressure building and regulating arrangement 28.

An input side of vapor motor 114 is connected to tee 158 via a conduit 168, and an output side of vapor motor 114 is connected to the hereinbefore mentioned conduit 152. If the demand for vaporized cryogen 20 increases, additional vaporized cryogen may be provided by an arrangement which includes tapping liquid conduit 30 with a tee 174, tapping conduit 168 with a tee 176, and connecting an ambient coil or loop 178 between tees 174 and 176 via a valve 180. When valve 180 is opened by control 124, ambient loop 178 vaporizes liquid cryogen 18, adding to the available supply of vaporized cryogen.

As hereinbefore discussed, additional vaporized cryogen may be provided without requiring the addition of ambient loop 178, by using heat generated by refrigeration system 10 during normal operation thereof to enhance the heating of vaporizing coil 34. This arrangement is especially advantageous during low ambient temperatures. Drawing vaporized cryogen 20 from vessel 16 is also more desirable than drawing liquid cryogen 18 from vessel 16 via ambient loop 178 because the heat of vaporization removes heat from the liquid cryogen 18. For example, as shown in FIG. 1, hot gases produced by burner 150 may be directed from heater housing 147 to vaporizing housing 35 via a conduit 179 and a valve 181. Alternatively, as will be hereinafter described relative to FIGS. 2 and 3, warmed liquid coolant associated with internal combustion engine 41 may be directed in heat exchange relation with vaporizing coil 34. Ambient loop 178, when provided, may be heated with by-product heat in the same manner as just described relative to vaporizing coil 34.

Pump 54 may be driven by vapor motor 114, as illustrated in FIG. 1 by a pulley-belt arrangement 182, or by an associated internal combustion engine, as will be hereinafter described relative to FIG. 3. Pump 54 may also be driven by a motor, such as an electric, hydraulic or pneumatic motor. When an electric motor is used, a suitable source of electrical power for the motor will be hereinafter described relative to FIG. 3.

As illustrated in FIG. 1, internal combustion engine 41 is preferably operated using vaporized fuel 20 from the cryogenic means 13. For example, engine 41 may utilize vaporized fuel after it has been expanded in vapor motor 114, with the expansion of the vaporized fuel driving vapor motor 114. If the vapor leaving vapor motor 114 is sufficiently cold, it may be passed through a separate path through heat exchanger 46, or the heat exchanger associated with apparatus 15, to gain an additional cooling benefit, before directing the vapor to internal combustion engine 41. Conduit 152 may be tapped with a tee 184, and tee 184 may be connected to engine 41 via a conduit 186 which includes a pressure regulating valve 188. Sufficient vaporized fuel 20 is assured by tapping conduits 168 and 186 with tees 190 and 192, respectively, and connecting a conduit 193 therebetween which includes a valve 194 and an expansion valve 195 which may have a fixed or a controlled orifice to provide approximately the same pressure drop as provided by vapor motor 114.

Tees may be provided in fluid flow path portion 44, as disclosed in concurrently filed application Ser. Nos. 07/982,548 and 07/982,370. When refrigeration system 10 is associated with an application which requires both air conditioning and refrigeration, such as a transport application in which vehicle 12, in addition to conditioned space 14, includes a driver's cab to be air conditioned via the secondary fluid 104 while vehicle 16 is parked and occupied, making it unnecessary to operate the vehicle engine 41. The tees in fluid flow path portion 44 enable secondary fluid 104 to be selectively circulated through a heat exchanger associated with such a driver's cab.

When electrical control 124 detects the need for a cooling cycle in conditioned space 14 to maintain the set point temperature selected on set point selector 126, electrical control 124 energizes and thus opens valves 82 and 86, and electrical control 124 controls flow control valve 60 to control the flow rate of the secondary fluid 104 through the first heat exchanger 46. Cooled secondary fluid 104 is pumped from the second heat exchanger 78 to the first heat exchanger 46 via conduits 84, 52, 56, and 62. Heat in the return air 122 from conditioned space 14 is transferred to the secondary fluid 104, and the heated secondary fluid is pumped to the second heat exchanger 78 via conduits 64, 70, 75 and 80, where the heat is transferred into the liquid cryogen 18, and then removed therefrom by the heat of vaporization as liquid cryogen 18 vaporizes, providing vaporized cryogen 20 for the operation of vapor motor 114, burner 150, and internal combustion engine 41.

When a second conditioned space and air conditioning arrangement 15 is provided in series with heat exchanger 46, and a cooling cycle is required in apparatus 15, flow control valve 100 is opened to allow secondary fluid in conduit 64 to circulate through the associated heat exchanger. The temperature of a second conditioned space associated with air conditioning apparatus 15 is selected via set point selector 138 to be a higher temperature conditioned space than conditioned space 14. For example, conditioned space 14 may contain a frozen load, and the conditioned space indicated generally at 15 may contain a fresh load. If both conditioned spaces contain fresh loads, conditioned space 14 would be associated with the lower temperature load.

When apparatus 15 is connected in parallel with heat exchanger 46 via connector 58 and conduit 96', valve 100 is opened by electrical control 124 to allow secondary fluid in conduit 56 to circulate through the associated heat exchanger. In this embodiment of apparatus 15, apparatus 15 is not subject to the limitation of controlling to a higher temperature than conditioned space 14.

If the air flow in conditioned space 14 during the cooling cycle is insufficient, such as detected by an air flow rate feedback sensor 203, or by speed sensor means 207 associated with vapor motor 110, such as a toothed wheel and sensor arrangement, electrical control 124 opens valve 180, when ambient loop 178 is provided; or control 124 opens valve 181; or control 124 opens a valve shown in FIG. 3 which allows warmed engine coolant to flow into heat exchange relation with vaporizing coil 34, when by-product heat is arranged to enhance the ability of pressure regulating coil 34 to produce vaporized cryogen.

When a heating cycle is required to hold the set point temperature in conditioned space 14, electrical control 124 closes valves 82 and 86, to completely isolate the second heat exchanger 78 from the secondary fluid flow path 44, valves 94 and 154 are opened, and burner 150 is ignited. The secondary fluid 104 is then pumped through the coil turns 146 of the third heat exchanger 88, with the heated secondary fluid 104 being directed to the first heat exchanger 46 via the now open valve 94 and conduits 52, 56 and 62. Secondary fluid 104 from heat exchanger 46 is directed back to the third heat exchanger 88 via conduits 64, 70, 75 and 90. A defrost cycle to defrost and remove water ice which may build up on the first heat exchanger 46 during a cooling cycle is similar to the heating cycle, except damper 128, when provided, is closed, to prevent warm air from being discharged into conditioned space 14; or, alternatively, valve 170 may be closed during a defrost defrost cycle. Valve 194, if not already open, would be opened when valve 170 is closed to assure a flow of fuel to burner 150 and engine 41.

When the second conditioned space 15 requires heat during a heating cycle in the first conditioned space 14, valve 100 is controlled accordingly. When conditioned space 14 is associated with a frozen load, a heating cycle is not required for space 14, and a controllable by-pass arrangement 204 may be provided to enable the first heat exchanger 46 to be by-passed in the first or series embodiment of apparatus 15. By-pass arrangement 204 includes a connector 58 in conduit 56, and a conduit 208 disposed between connector 58 and connector 66, with conduit 208 including a valve 210. By-pass arrangement 204 also permits electrical control 124 to select a null cycle, in addition to the heating and cooling cycles, when conditioned space 14 requires neither a heating cycle nor a cooling cycle to maintain the set point temperature. If heat exchanger 46 requires defrosting and apparatus 15 requires a cooling cycle in the series embodiment of apparatus 15, heated fluid is passed through heat exchanger 46, by-passing apparatus 15 by closing valve 100 and opening valve 67. If apparatus 15 requires a defrost cycle while heat exchanger 46 requires a cooling cycle, valves 60 and 67 are closed and valves 210 and 100 are opened. In the parallel embodiment of apparatus 15, each parallel path is individually controlled as required to obtain the desired heating, cooling or defrost cycles in the associated conditioned spaces. Thus, electrical control 124 may independently serve the cooling, heating, and defrost requirements of conditioned spaces 14 and 15 by controlling valves 60, 67, 100, and 210.

FIG. 2 is a diagrammatic representation of a refrigeration system 212 which is similar to refrigeration system 10 shown in FIG. 1 except illustrating a thermosiphon arrangement for circulating the secondary fluid 104, eliminating the need for pump 54 of the FIG. 1 embodiment. Like reference numerals in FIGS. 1 and 2 indicate like components and they are not described again relative to FIG. 2. In the thermosiphon arrangement of FIG. 2 it is important that the second heat exchanger 78' be located at an elevation higher than the elevation of the first heat exchanger 46, and that the first heat exchanger 46 be located an elevation which is higher than the elevation of the third heat exchanger 88. The relative elevations of the first, second and third heat exchangers 46, 78 and 88 are respectively indicated at 214, 216 and 218.

In the thermosiphon arrangement of FIG. 2, during a cooling cycle, the secondary fluid leaving the first heat exchanger 46 will be warmer than the secondary fluid in the second heat exchanger 78, providing thermal gradients which move the warmer secondary fluid upward to the second heat exchanger 78, and the cooler secondary fluid downward from the second heat exchanger 78 to the first heat exchanger 46. Valve 94 will be closed to prevent circulation through heat exchanger 88. In like manner, during a heating cycle, valves 82 and 86 will be closed and valve 94 will be open. The secondary fluid leaving the third heat exchanger 88 will be warmer than the secondary fluid in the first heat exchanger 46, providing thermal gradients which move the warmer secondary fluid upward to the first heat exchanger 46, and the cooler secondary fluid in the first heat exchanger 46 downward to the third heat exchanger 88.

FIG. 2 also illustrates that a cooling water jacket 220 associated with internal combustion engine 41 may be provided and connected to a heat exchanger 222 which is disposed in heat exchange relation with vaporizing coil 34 of pressure building and vaporizing arrangement 28. Coolant conduits 224 and 226 circulate heated engine coolant from water jacket 220 through heat exchanger 222, via a flow control valve 228. Instead of using heat exchanger 222, a flooded design may be used wherein housing 35 contains the heated engine coolant in direct contact with coil 34.

FIG. 3 is a diagrammatic representation of a refrigeration system 230 constructed according to another embodiment of the invention. Like reference numerals in FIGS. 1 and 3 indicate like components and thus they are not described again during the description of the FIG. 3 embodiment. The embodiment of FIG. 3 illustrates that a refrigeration system may have a small internal combustion engine 232 which is dedicated to providing mechanical and electrical power for the operation of pumps, fans, control, and the like, with the dedicated internal combustion engine 232 being operated via the cryogenic fuel 20. For example, conduit 168, instead of being connected to vapor motor 114, is connected to a connector 234 via a pressure regulating valve 236. Connector 234 is connected to a first branch which includes a conduit 238 having a flow control valve 240, with the first branch providing a fuel supply for dedicated engine 232.

Dedicated engine 232 drives an electrical generator or alternator 242, such as via a pulley-belt arrangement 244, and the electrical output of generator 242 is connected to an electrical circuit 246 which maintains a battery 248 in a fully charged condition. Electrical circuit 246 also provides electrical power for other purposes, such as for driving an electrical motor 250 connected to fan 112 of air mover means 110'. Engine 232 may drive pump 54, such as via a pulley-belt arrangement 252; or, pump 54 may be driven by an electrical motor connected to circuit 246, as desired.

Connector 234 is connected to a second branch which includes the hereinbefore described heating means 148 via conductor 152. Connector 234 may be connected to a third branch 254 which is available for other apparatus which requires vaporized fuel, such as for a vehicle drive engine as described in the embodiments of FIGS. 1 and 2, or for an engine associated with a refrigerated container's gen-set.

In a preferred embodiment of the invention, instead of venting cryogenic fuel from vessel 16 in response to vessel 16 reaching a predetermined pressure sensed by valve 38, the associated internal combustion engine is started by electrical control 124, as indicated by control output conductor 256, at a pressure just below the release setting of valve 38. As hereinbefore stated, electrical control 124 senses the pressure level in vessel 16 via control input conductor 135. Starting the associated engine in response to pressure will reduce the pressure in vessel 16, and preclude the venting of unburned fuel.

When the engine is the dedicated internal combustion engine 232 of FIG. 3, engine 232 is always under the supervision of electrical control 124, and engine 232 may be started and stopped whenever control 124 deems it necessary. When engine 41 is involved, which drives a vehicle, electrical control 124 checks to determine if it is safe to start engine 41 before starting it for pressure control. Suitable sensors (not shown) provide inputs to electrical control 124, with electrical control making the decision on whether or not it is safe to start engine 41 based upon the sensor readings. Suitable sensors and logic circuitry for making the determination of whether it is safe to remotely start an engine which drives a vehicle are disclosed in U.S. Pat. No. 5,072,703, which is hereby incorporated into the specification of the present application by reference.

While not illustrated in FIGS. 2 and 3, the embodiments of the invention shown in FIGS. 2 and 3 may also utilize the multiple conditioned space arrangement of FIG. 1. Further, the embodiment of the invention shown in FIG. 3 may utilize the thermosiphon arrangement of FIG. 2 by locating the second heat exchanger 78' at a higher elevation than the first heat exchanger 46, and by locating the first heat exchanger 46 at a higher elevation than the third heat exchanger 88.

While not illustrated in the Figures, in order to prevent excessive pressures from building up when the refrigeration systems of the invention are shut down, a pressure relief valve should be added at any location where cryogen may be trapped between two valves at shut down.

We claim:

1. A refrigeration system associated with a conditioned space to be controlled to a predetermined set point temperature via heating and cooling cycles, the improvement comprising:
   cryogenic cooling means,
   said cryogenic cooling means including a fuel in a cryogenic state,
   first heat exchanger means in heat transfer relationship with said conditioned space,
   second heat exchanger means in heat transfer relationship with said cryogenic cooling means,
   means interconnecting said first and second heat exchanger means to provide a cooling cycle,
   heating means,
   third heat exchanger means in heat transfer relationship with said heating means,
   and means interconnecting said first and third heat exchanger means to provide a heating cycle,
   said heating means including means for utilizing fuel from said cryogenic cooling means during a heating cycle.

2. The refrigeration system of claim 1 wherein the cryogenic fuel includes a liquid phase, and including:
   an internal combustion engine,
   means vaporizing the liquid fuel,
   and means connecting said vaporized liquid fuel to said internal combustion engine.

3. The refrigeration system of claim 2 wherein the refrigeration system is a transport refrigeration system associated with a vehicle, with the internal combustion engine being associated with the vehicle.

4. The refrigeration system of claim 1 wherein the cryogenic fuel includes a liquid phase, and including:
   an internal combustion engine,
   air mover means for circulating air between the conditioned space and the first heat exchanger means,
   said air mover means including a vapor motor,
   means for vaporizing the liquid fuel,
   means directing vaporized fuel to said vapor motor, to operate said vapor motor by expanding said vaporized fuel therein,
   and means directing vaporized fuel from said vapor motor to said internal combustion engine, to operate said internal combustion engine with said expanded vaporized fuel.

5. The refrigeration system of claim 4 wherein the refrigeration system is a transport refrigeration system associated with a vehicle, with the internal combustion engine being associated with the vehicle.

6. The refrigeration system of claim 1 wherein the means interconnecting the first and second heat exchanger means includes:
   a fluid flow path having a predetermined secondary fluid therein,
   means for circulating said secondary fluid in said fluid flow path,
   and control means for arranging said fluid flow path such that said secondary fluid circulates between the first and second heat exchanger means during a cooling cycle.

7. The refrigeration system of claim 6 wherein the control means arranges the fluid flow path such that the secondary fluid circulates between the first and third heat exchanger means during a heating cycle.

8. The refrigeration system of claim 6 wherein the means for circulating the fluid in the fluid flow path includes a pump.

9. The refrigeration system of claim 8 wherein the cryogenic fuel includes a liquid state, and including:
   air mover means for circulating air between the conditioned space and the first heat exchanger means,
   said air mover means including a vapor motor,
   means for vaporizing the liquid fuel,
   means directing said vaporized fuel to said vapor motor, to operate said vapor motor by expanding said vaporized fuel therein,
   and means operably interconnecting said vapor motor and the pump.

10. The refrigeration system of claim 6 wherein the means for circulating the fluid in the fluid flow path includes a thermosiphon arrangement wherein the first heat exchanger means is disposed at a lower elevation than the second heat exchanger means.

11. The refrigeration system of claim 7 wherein the means for circulating the fluid in the fluid flow path includes a thermosiphon arrangement wherein the first heat exchanger means is disposed at a lower elevation than the second heat exchanger means, and at a higher elevation than the third heat exchanger means.

12. The refrigeration system of claim 1 wherein the cryogenic fuel includes a liquid phase, and including:
   an internal combustion engine,
   means vaporizing the liquid fuel,
   means directing the vaporized fuel to said internal combustion engine for operating said internal combustion engine therewith,
   electrical generator means driven by said internal combustion engine,
   and air mover means for circulating air between the conditioned space and the first heat exchanger means,
   said air mover means including an electric motor operated by said electrical generator means.

13. The refrigeration system of claim 12 wherein the means which interconnects the first and second heat exchanger means includes:
- a fluid flow path having a predetermined secondary fluid therein,
- pump means for circulating said secondary fluid in said fluid flow path,
- and control means for arranging the fluid flow path such that the secondary fluid circulates between the first and second heat exchanger means during a cooling cycle,
- said pump means being driven by the internal combustion engine.

14. The refrigeration system of claim 1 wherein the cryogenic fuel includes a liquid phase, and including:
- an internal combustion engine,
- means vaporizing the liquid fuel,
- means directing the vaporized fuel to said internal combustion engine for operating said internal combustion engine therewith,
- electrical generator means driven by said internal combustion engine,
- air mover means for circulating air between the conditioned space and the first heat exchanger means,
- said air mover means including an electric motor operated by said electrical generator means,
- and wherein the heating means includes burner means for using a portion of the vaporized fuel to provide heat during a heating cycle.

15. The refrigeration system of claim 14 wherein the means which interconnects the first and second heat exchanger means includes:
- a fluid flow path having a predetermined secondary fluid therein,
- pump means for circulating said secondary fluid in said fluid flow path,
- and control means for arranging the fluid flow such that the secondary fluid circulates between the first and second heat exchanger means during a cooling cycle,
- said pump means being driven by the internal combustion engine.

16. The refrigeration system of claim 15 wherein the predetermined fluid is a liquid having a characteristic of remaining in a liquid state while being circulated in the fluid flow path.

17. The refrigeration system of claim 15 wherein the cryogenic cooling means includes a supply vessel which contains the fuel in the cryogenic state which includes a liquid phase, with the second heat exchanger means being in heat exchange relation with said supply vessel.

18. The refrigeration system of claim 1 including air mover means which circulates air between the conditioned space and the first heat exchanger means, with said air mover means including a vapor motor, and wherein the cryogenic cooling means includes a supply vessel containing the liquid fuel in the cryogenic state, and including pressure building means which vaporizes liquid cryogen from the supply vessel, with the vaporized cryogen maintaining a predetermined minimum pressure in the supply vessel and also providing vaporized cryogen which is expanded in said vapor motor.

19. The refrigeration system of claim 18 including an internal combustion engine, with said internal combustion engine being operated by the expanded vaporized cryogen.

20. The refrigeration system of claim 19 wherein the internal combustion engine includes a liquid coolant which is heated during the operation of the internal combustion engine, and including means directing said heated liquid coolant in heat exchange relation with the pressure building means to enhance the transformation of liquid cryogen to vaporized cryogen.

21. The refrigeration system of claim 1 including air mover means which circulates air between the conditioned space and the first heat exchanger means, with said air mover means including a vapor motor, and wherein the cryogenic cooling means includes a supply vessel containing the liquid fuel in the cryogenic state which includes a liquid phase, and including means for vaporizing the liquid cryogen, and means for directing the vaporized cryogen to the vapor motor means.

22. The refrigeration system of claim 1 wherein the cryogenic fuel includes a liquid phase in a supply vessel, and including:
- an internal combustion engine,
- means vaporizing the liquid fuel,
- means connecting said vaporized liquid fuel to said internal combustion engine,
- means detecting the pressure in said supply vessel,
- and means for starting the internal combustion engine in response to predetermined conditions, including the pressure in said supply vessel.

* * * * *